(12) United States Patent
Kwilosz et al.

(10) Patent No.: US 7,448,579 B2
(45) Date of Patent: Nov. 11, 2008

(54) VIBRATION DAMPENING CLIP

(75) Inventors: Mark J. Kwilosz, Chicago, IL (US); George Siragusa, Chicago Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 350 days.

(21) Appl. No.: 11/202,704

(22) Filed: Aug. 12, 2005

(65) Prior Publication Data

US 2006/0226301 A1    Oct. 12, 2006

Related U.S. Application Data

(60) Provisional application No. 60/670,339, filed on Apr. 12, 2005.

(51) Int. Cl.
*F16B 15/00* (2006.01)

(52) U.S. Cl. .................. 248/71; 248/74.1; 248/74.2

(58) Field of Classification Search ............... 248/56, 248/71, 74.1, 74.2, 68.1, 316.7; 24/50, 297, 24/453, 458
See application file for complete search history.

(56) References Cited

U.S. PATENT DOCUMENTS

| 1,792,611 | A | * | 2/1931 | Staaf, Jr. ............. | 174/138 H |
|---|---|---|---|---|---|
| 5,190,251 | A | * | 3/1993 | Bodo .................. | 248/73 |
| 5,257,768 | A | * | 11/1993 | Juenemann et al. ..... | 248/604 |
| 5,535,969 | A | * | 7/1996 | Duffy, Jr. ............ | 248/68.1 |
| 5,759,004 | A | * | 6/1998 | Kuffel ................ | 411/508 |
| 5,797,675 | A | * | 8/1998 | Tanner, Jr. ........... | 362/396 |
| 5,820,048 | A | * | 10/1998 | Shereyk et al. ........ | 248/68.1 |
| 5,906,342 | A | * | 5/1999 | Kraus ................ | 248/74.1 |
| 6,145,793 | A | * | 11/2000 | Kroulik et al. ........ | 248/74.1 |
| 6,241,198 | B1 | * | 6/2001 | Maruyama ........... | 248/49 |

* cited by examiner

*Primary Examiner*—Gwendolyn Baxter
(74) *Attorney, Agent, or Firm*—Mark W. Croll; Paul F. Donovan

(57) ABSTRACT

A vibration dampening clip suitable for securing a tube, such as a brake line, to a motor vehicle frame member includes an anchor portion for connecting the clip to the frame member, a retainer structure for holding the tube and a spring interconnecting the anchor portion and the retainer structure.

13 Claims, 2 Drawing Sheets

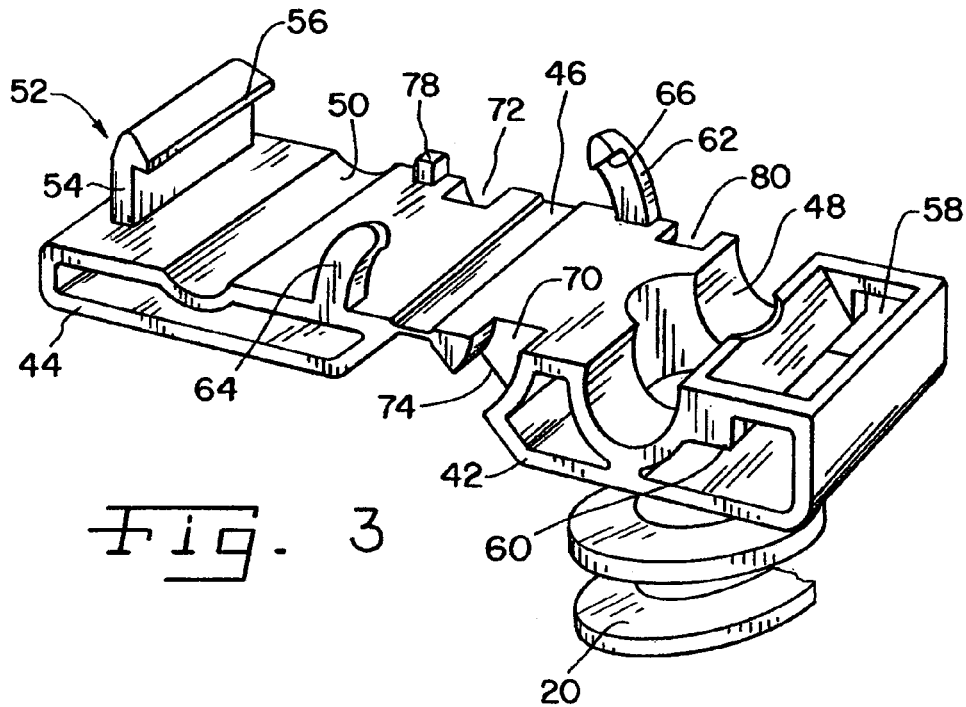
Fig. 3
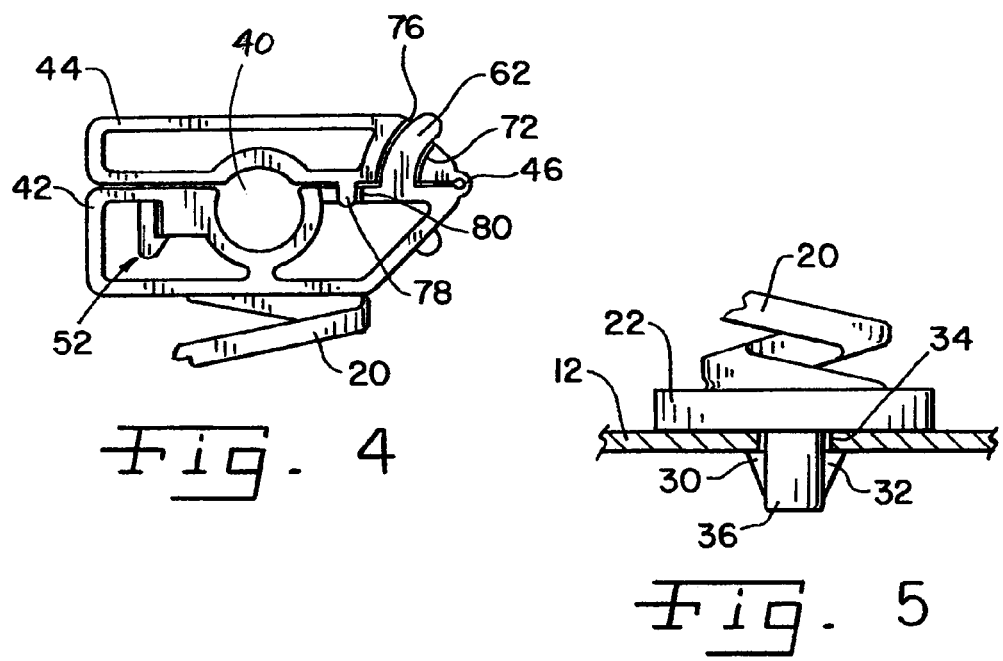
Fig. 4
Fig. 5

VIBRATION DAMPENING CLIP

CROSS-REFERENCE TO RELATED APPLICATIONS

The present regular U.S. patent application claims the benefits of U.S. Provisional Application Ser. No. 60/670,339 filed on Apr. 12, 2005.

FIELD OF THE INVENTION

The present invention relates generally to holding devices commonly referred to as "clips" used for routing items such as pipes, tubes, wires and the like; and, more particularly, the invention relates to clips configured for reducing vibrations transferred through the clip between the article to which the clip is anchored and the item that is held by the clip.

BACKGROUND OF THE INVENTION

Holding devices of various types are known for routing items such as tubes, pipes, wires, rods and the like. Holding devices for this purpose are known to include some type of anchoring fixture for securing the holding device to the object on which it is used. The anchoring fixture can be a threaded part, a deflectable self-locking leg for inserting into a hole, a mounting plate with holes for bolts, screws, rivets or other types of fasteners, or any of a variety of other constructions that can be used to attach the holding device to the object, such as, for example an automobile. The holding device will further include a retainer structure that holds and secures the pipe, tube, rod, wire or other item or thing that is to be held in position relative to the object.

Holding devices of the type generally described above are used extensively in the automotive industry for routing wires, brake lines, fuel lines and other similar items. In some applications of the use for such holding devices, it is desirable to provide at least some degree of vibration isolation between the item being held and the object to which the holding device is attached. For example, in the routing of brake lines, fuel lines or the like on an automobile, mounting clips are secured to the automobile frame and are configured for holding the brake lines, fuel lines or other items therein. Depending on the location in which the holding device is used, the vibrations can be imparted from the vehicle frame through the holding device to the brake line, fuel line or the like being held therein. Conductance of vibrations to fuel lines, brake lines, wires and the like is undesirable in that vibration can cause fatigue and ultimate failure. For example, it may be desirable to provide a holding device attached to the engine cradle for holding brake lines running there past. During normal operating conditions of the vehicle, the engine cradle rolls and vibrates during acceleration and turning maneuvers. These conditions cause relative motion and vibration to be translated to the brake tube. Relative motion between the engine cradle and the brake tube can cause stress in the tube, especially near end fittings of the tube, potentially causing failure and brake fluid leaks.

Another problem occurs if tubes or the like are also connected near the dash area of the passenger compartment. If vibrations from the engine frame, cradle or the like are transmitted to the tube, the vibration can also cause undesirably harsh noises to be transmitted to the vehicle passenger compartment. Accordingly, it is desirable to have a clip or fastener that accommodates relative motion between the object to which the clip is fastened or anchored and the item secured in the clip.

Known vibration dampening clips have included leaf springs to incorporate some flexibility into the fastener. However, a leaf spring allows motion in only one axis, the axis normal to the chassis hole. Further, the travel distance permitted by such fasteners has been limited and sometimes inadequate for the amount of vibration that occurs.

In another example of the prior art used to dampen vibrations, rigid fasteners have been provided with an overmolded soft elastomer tube pocket. These too have worked well in some situations. However, the two shot overmolding process required to create a rigid clip having a soft liner is expensive and time consuming, thereby adding cost to the manufacture of the clip.

What is needed in the art is a vibration dampening clip that is inexpensive to manufacture, easy to install and use and provides flexible movement in all axis relative to the anchor portion of the clip.

SUMMARY OF THE INVENTION

The present invention provides a vibration dampening clip having an anchoring portion and a retainer structure that can move in all directions relative to each other, and that can be provided as a single monolithic body of cast plastic in a cost efficient manufacturing process.

In one aspect thereof, the present invention provides a vibration dampening clip with an anchor portion configured for attaching the clip to an object; a retainer structure configured for securing an item to be held by the clip; and a spring interconnecting the anchor portion and the retainer structure.

In another aspect thereof, the present invention provides a tube routing clip for securing the position of a tube, such as a brake line, relative to a motor vehicle frame component. The clip has an anchor portion configured for attaching the clip to a motor vehicle frame component. The anchor portion includes a base for engaging a surface of a motor vehicle frame component. A retainer structure defines a pocket for receiving a tube and includes a body. A spring is connected at one end to the base of the anchor portion and an opposite end to the body of the retainer structure.

In a further aspect thereof, the present invention provides a clip for securing the position of a tube relative to a motor vehicle frame component. The clip has an anchor portion configured for attaching the clip to a motor vehicle frame component; a retainer structure for receiving and securing a tube; and a yielding connection between the anchor portion and the retainer structure. The yielding connection is configured to allow relative movement of the anchor portion and the retainer structure toward and away from each other and relative tilting between the anchor portion and the retainer structure in any direction.

An advantage of the present invention is providing a vibration dampening clip that is easy and inexpensive to manufacture.

Another advantage of the present invention is providing a vibration dampening clip that is easy to install and use.

Still another advantage of the present invention is providing a vibration dampening clip that allows relative movement in all directions between an anchor portion of the clip and a retainer structure of the clip, thereby dampening transfer of vibrations from one to the other.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a perspective view illustrating the top of the vibration dampening clip shown in FIG. 2;

FIG. 4 is an elevational view of the vibration dampening clip in a closed condition, and illustrating the side opposite the side shown in FIGS. 2 and 3; and FIG. 5 is a fragmentary elevational view of the vibration dampening clip shown in an installed condition, with the object to which the clip is installed shown in cross-section.

Figure 1:
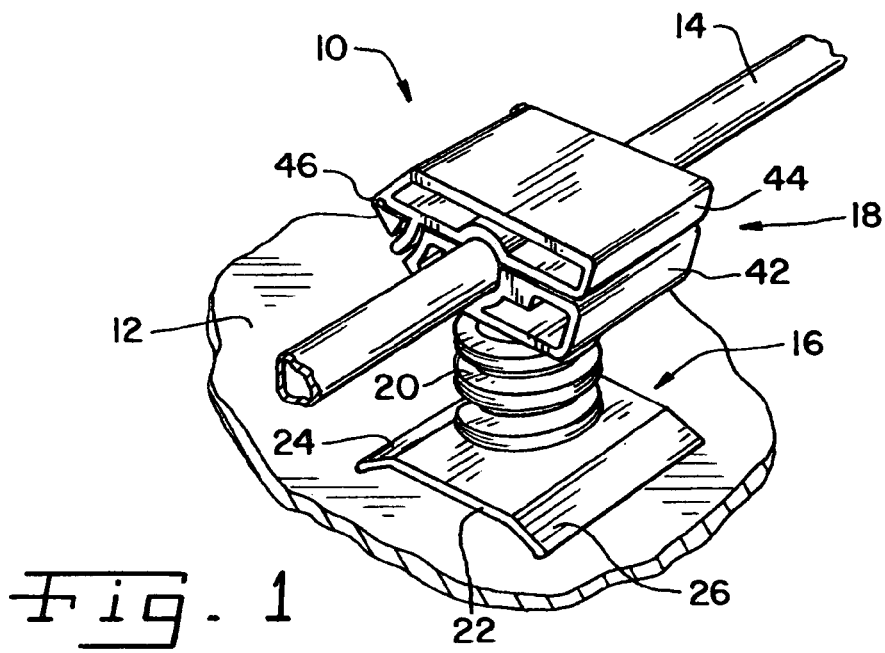
FIG. 1 is a perspective view of a vibration dampening clip in accordance with the present invention installed on an object and securing a tube therein.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a vibration dampening clip 10 is shown installed on an object 12 for securing the position of an item 14. In the exemplary embodiment shown in FIG. 1, item 14 is a tubular item 14 such as a brake line or the like, and object 12 is a motor vehicle frame component, such as a motor cradle or the like. However, it should be understood that the present invention can be used for securing a variety of different items including other types of tubes, hoses, conduits and the like, wires or even discrete articles to be secured to objects 12 other than motor vehicle frames. The use of vibration dampening clip 10 as illustrated and described is merely one exemplary advantageous use of the present invention, and the invention should not be considered as limited to the securing of tubes or conduits to motor vehicle frames.

Dampening clip 10 includes an anchor portion 16, a retainer structure 18 and a yielding connection 20 in the nature of a spring 20 interconnecting anchor portion 16 and retainer structure 18. The yielding connection between anchor portion 16 and retainer structure 18 allows relative movement between portion 16 and structure 18 toward or away from each other, and relative tilting therebetween in any direction. The yielding connection is shown as a helical spring 20 in the figures, but can be of different shapes and configurations. For example, the yielding connection can be a single compression type spring or a pair of spaced apart compression springs interconnecting the anchor portion 16 and retainer structure 18. According to one aspect of the present invention, dampening clip 10 can be formed as a single monolithic body of plastic such as nylon or other suitable material and can be formed in a single operation including the formation of anchor portion 16, retainer structure 18 and yielding connector 20. Accordingly, dampening clip 10 can be formed in a simple, inexpensive process at reasonable expense.

Figure 2:
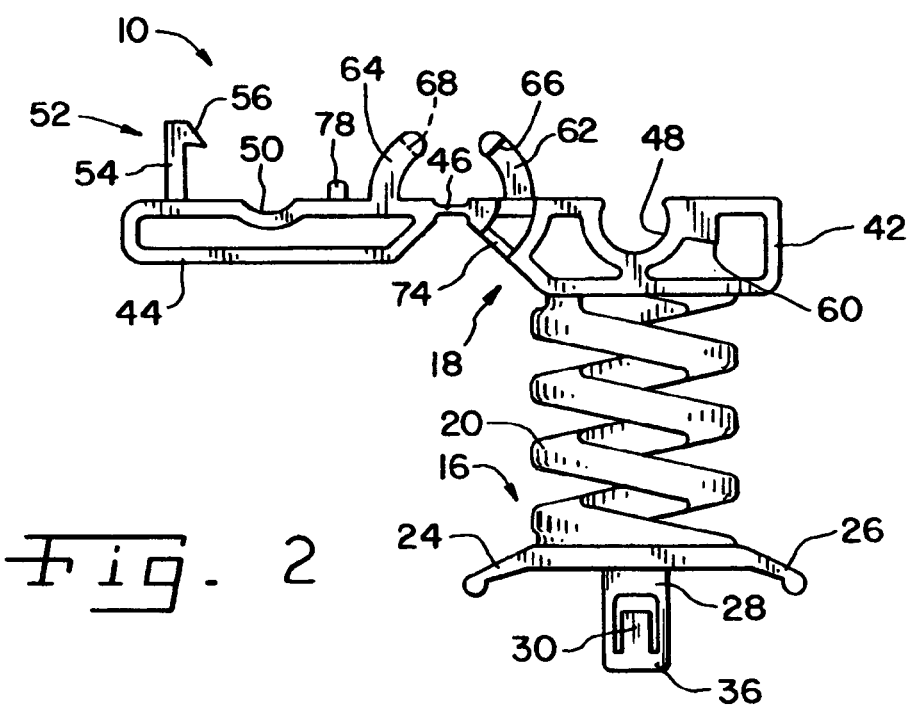
FIG. 2 is a side view of the vibration dampening clip shown in FIG. 1, illustrating the clip in an open and uninstalled condition.

Anchor portion 16 is configured for attachment of dampening clip 10 to object 12. Thus, anchor portion 16 can be configured in a variety of different ways to secure dampening clip 10 to one or more holes, bosses or other structures provided on object 12. In the exemplary embodiment shown in the drawings, anchor portion 16 includes a flat plate-like base 22 having side segments 24, 26 on opposite sides of base 22 that are angularly disposed relative to plate 22. A post 28 extends outwardly from base 22 and includes outwardly directed tabs 30 and 32 on opposite sides of post 28. Thus, as shown in FIGS. 2 and 5, anchor portion 16 is suitably configured for attachment of dampening clip 10 to and through a hole 34 provided in object 12. A distal end 36 of post 28 is first inserted through hole 34 from one side of object 12. As post 28 is inserted more completely through hole 34, tabs 30, 32 are deflected inwardly to pass through hole 34. As tabs 30, 32 pass completely through hole 34, tabs 30, 32 rebound outwardly and are wider between the outer most edges thereof than is the diameter of hole 34. Accordingly, tabs 30, 32 inhibit extraction of post 28 from hole 34. Side segments 24 and 26 of base 22 provide a spring-like biasing force against object 12 when object 12 is secured between base 22 and the confronting surfaces of tabs 30, 32. Those skilled in the art will readily understand that anchor portion 16 can also be configured as a threaded stud, a plate with holes for receiving bolts, rivets, screws and the like or anchor portion 12 can be otherwise configured for attaching vibration dampening clip 10 to the article in which it is used. Anchor portion 12 also can be configured with multiple structures for attachment to object 12, such as, for example, multiple posts 28.

In the exemplary embodiment shown, retainer structure 18 defines a pocket 40 (FIG. 4) for receiving a single elongated generally tubular shaped item 14 such as tube 14 shown in FIG. 1. However, those skilled in the art should readily understand that retainer structure 18 can be configured to hold two or more tubes 14 by defining two or more pockets 40 or can be configured for holding other shaped items than the generally cylindrical elongated tube 14. Further, retainer structure 18 can be configured for holding completely different types of items 14.

In the exemplary embodiment, retainer structure 18 includes a body 42 defining a significant portion of pocket 40 and a cover 44 connected to body 42 by a hinge 46. Pocket 40 is formed by a channel 48 in body 42 and a groove 50 in cover 44 that are aligned with one another when cover 44 is closed over body 42. Hinge 46 is a thinned region of material forming body 42 and cover 44, thereby allowing cover 44 to pivot from an open position as illustrated in FIG. 2 and FIG. 3 to closed positions as illustrated in FIG. 1 and FIG. 4.

To secure retainer structure 18 in a closed condition, cover 44 is provided with a latch 52 having a pedestal 54 and a hooked end 56. As cover 44 is closed over body 42, latch 52 is inserted through a cavity 58 in body 42. Hooked end 56 has an angular surface for sliding past a ledge 60 in cavity 58, deflecting pedestal 54 to do so. Pedestal 54 rebounds when hooked end 56 passes ledge 60, causing hooked end 56 to engage ledge 60, and thereby holding cover 44 in place over body 42. Thus, as shown most clearly in FIG. 4, retainer structure 18 is held in a closed condition by the engagement of hooked end 56 and ledge 60.

Guiding structures are provided to ensure proper alignment and positioning of cover 44 relative to body 42 so that groove 50 aligns with channel 48 to secure, item 14 in pocket 40 as retainer structure 18 is closed. This ensures that item 14 is held correctly, without pinching or restriction. Curved guide members 62 and 64 are provided on body 42 and cover 44, respectively. On inner surfaces thereof, guide members 62, 64 are provided with shoulders 66 and 68, respectively. Curved slots 70, 72 are provided on body 42 and cover 44, respectively. Slots 70, 72 are positioned and configured for receiving guide members 64, 62, respectively. Edges 74 and 76 are provided in the bases of slots 70 and 72, respectively. In closed conditions, shoulders 66 and 68 engage base edges 74, 76 of channels 70, 72, respectively.

Pedestal 54 and guide members 62, 64 are sufficiently flexible to allow the necessary deflection thereof as cover 44 is closed onto body 42. Accordingly, hooked end 56 and shoulders 66, 68 can be deflected outwardly as necessary to pass past the complimentary structures before engaging ledge 60 and channel base edges 74, 76 respectively. However, once closed it is desirable that cover 44 be rigidly positioned relative to body 42 so that cover 44 is not opened unintentionally. A boss 78 is provided on cover 44 and is received in a cutout 80 of body 42. Boss 78 is relatively short and thick, thereby being substantially rigid. When received in cutout 80, boss 78 inhibits deflection of cover 44 relative to body 42.

While guide members 62, 64 have been shown with one each on body 42 and cover 44, respectively and complementary channels 72, 74 provided in each body 42 and cover 44, those skilled in the art will readily understand that one or more guide members can be provided on either or both of body 42 and cover 44 with appropriate channels for receiving the guide members provided in the other. Further, other types of guiding structures also can be used. Similarly, two or more latches 52 can be used as well as other types of closing structures including fasteners or the like with appropriate cooperating portions thereof provided on base 42 and cover 44.

Yielding connector 20 is joined at opposite ends thereof to base 22 and body 42. Helical spring 20 provides freedom of movement for retainer structure 18 relative to anchor portion 16 in any angular direction. Retainer structure 18 can move axially toward or away from anchor portion 16 and can be twisted or turned at any angular position relative to anchor portion 16. Accordingly, helical spring 20 provides complete freedom of movement within a relatively large physical range for retainer structure 18 relative to anchor portion 16. As a result, vibrations are not directly transmitted but instead are dampened between retainer structure 18 and anchor portion 16. Thus, vibrations that may originate in object 12 are dampened before transmission to item 14. Similarly, vibrations originating in item 14 are dampened before transmission to object 12.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vibration dampening clip comprising:
    an anchor portion configured for attaching said clip to an object, said anchor portion including a base;
    a retainer structure configured for securing an item to be held by said clip, said retainer structure having a body, a cover and a hinge interconnecting said body and said cover; and
    a helical spring interconnecting said anchor portion and said retainer structure, said spring being connected at one end thereof to said base and on an opposite end thereof to said body, said anchor portion, said retainer structure and said spring being formed as a single monolithic body of plastic material, such that said body includes an opening therethrough having an axis that is in axial alignment with an axis extending through said spring, said opening defining a void that extends from said body, through said spring and into said anchor portion;
    wherein said base has angular side segments on opposite sides thereof, said angular side segments angling away from said base in a direction away from said spring.

2. The vibration dampening clip of claim 1, said retainer structure configured for releasably holding the item.

3. The vibration dampening clip of claim 1, said anchor portion including a post extending outwardly from said base and deflectable tabs on opposite sides of said post.

4. The vibration dampening clip of claim 1, said body and said cover defining a pocket therebetween for receiving a substantially cylindrical elongated item.

5. The vibration dampening clip of claim 4, one of said body and said cover including at least one guide member and the other of said body and said cover including at least one slot configured for receiving said guide member as said cover is closed onto said body.

6. The vibration dampening clip of claim 5, including a guide member on each said body and said cover and a slot in each said body and said cover, said slots configured and positioned for receiving said guide members as said cover is closed onto said body.

7. The vibration dampening clip of claim 6, including a latch on one of said body and said cover and a ledge on the other of said body and said cover for engaging said latch.

8. The vibration dampening clip of claim 7, said latch being provided on said cover and said ledge being provided on said body.

9. A tube routing clip for securing the position of a tube relative to a motor vehicle frame component, said tube routing clip comprising:
    an anchor portion configured for attaching said clip to a motor vehicle frame component, said anchor portion including a base for engaging a surface of a motor vehicle frame component, said anchor portion including a post and outwardly directed deflectable tabs on said post;
    a retainer structure defining a pocket for receiving a tube, said retainer structure including a body; and
    a spring connected at one end to said base of said anchor portion and connected at an opposite end to said body of said retainer structure, said anchor portion, said retainer structure and said spring being formed as a single monolithic body of plastic material, such that said body includes an opening therethrough having an axis that is in axial alignment with an axis extending through said spring, said opening defining a void that extends from said body, through said spring and into said anchor portion.

10. The tube routing clip of claim 9, said retainer structure including a cover and a hinge connecting said cover to said body.

11. The tube routing clip of claim 10, said at least one of said body and said cover having a guide member, and at least the other of said body and said cover having a slot for receiving said guide member to position said cover relative to said body.

12. The tube routing clip of claim 9, wherein said spring is a helical spring.

13. A tube routing clip for securing the position of a tube relative to a motor vehicle frame component, said clip comprising:

an anchor portion configured for attaching said clip to a motor vehicle frame component, said anchor portion including a base, said anchor portion including a post and outwardly directed deflectable tabs on said post;

a retainer structure for receiving and securing a tube, said retainer structure including a body; and a yielding connection between said anchor portion and said retainer structure, said yielding connection being connected at one end thereof to said base and on an opposite end thereof to said body, said anchor portion, said retainer structure and said yielding connection being formed as a single monolithic body of plastic material, such that said body includes an opening therethrough having an axis that is in axial alignment with an axis extending through said yielding connection, said opening defining a void that extends from said body, through said yielding connection and into said anchor portion, said yielding connection configured to allow relative movement of said anchor portion and said retainer structure toward and away from each other and relative tilting between said anchor portion and said retainer structure in any direction;

wherein said base has angular side segments on opposite sides thereof, said angular side segments angling away from said base in a direction away from said yielding connection.

* * * * *